(12) United States Patent
Kubera et al.

(10) Patent No.: US 11,375,804 B1
(45) Date of Patent: ***Jul. 5, 2022

(54) ONLINE SOCIAL MEDIA NETWORK ANALYZER

(71) Applicant: Wells Fargo Bank, N.A., San Francisco, CA (US)

(72) Inventors: Jane R. Kubera, San Francisco, CA (US); Katie Kim, Lafayette, CA (US); Chris Theodore Kalaboukis, San Jose, CA (US); Jonathan A. Padilla, Fairfield, CA (US); Michael Alan Balsam, San Francisco, CA (US); Nicolette Haacke Frandsen, Walnut Creek, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/929,725

(22) Filed: Jul. 15, 2020

Related U.S. Application Data

(63) Continuation of application No. 15/394,661, filed on Dec. 29, 2016, now Pat. No. 10,733,667.

(51) Int. Cl.
*A46B 9/02* (2006.01)
*A46D 1/04* (2006.01)
*A46D 3/04* (2006.01)

(52) U.S. Cl.
CPC ............... *A46B 9/025* (2013.01); *A46D 1/04* (2013.01); *A46D 3/042* (2013.01); *A46B 2200/302* (2013.01)

(58) Field of Classification Search
CPC ........ G06Q 40/00; G06Q 40/02; A46B 9/025; A46D 1/04; A46D 3/042

USPC ........................................................... 705/35
See application file for complete search history.

(56) References Cited

U.S. PATENT DOCUMENTS

| | | | |
|---|---|---|---|
| 8,977,573 B2 | 3/2015 | Daya et al. | |
| 8,983,868 B1* | 3/2015 | Sehrer | G06Q 20/32 705/1.1 |
| 9,152,681 B2 | 10/2015 | Erhart et al. | |
| 9,154,853 B1 | 10/2015 | Fleischman | |
| 9,384,366 B2 | 7/2016 | Dravneek et al. | |

(Continued)

FOREIGN PATENT DOCUMENTS

WO  WO-2015048181 A1  4/2015

OTHER PUBLICATIONS

"U.S. Appl. No. 15/394,661, Examiner Interview Summary dated Jan. 23, 2020".

(Continued)

*Primary Examiner* — Namrata Boveja
*Assistant Examiner* — Liz P Nguyen
(74) *Attorney, Agent, or Firm* — Schwegman Lundberg & Woessner, P.A.

(57) ABSTRACT

Increasingly, individuals use online social network platforms (also referred to as Internet-based social networks) to access a variety of information and content, such as articles on various topics, updates related to a user and individuals within the user's network, friend suggestions, advertisements, news stories, and the like. Among other things, embodiments of the present disclosure can be used to help identify users of a social network based on various information.

20 Claims, 3 Drawing Sheets

(56) References Cited

U.S. PATENT DOCUMENTS

| | | | |
|---|---|---|---|
| 10,042,926 B1* | 8/2018 | Virochsiri | G06F 16/9024 |
| 2010/0280955 A1 | 11/2010 | Ross et al. | |
| 2012/0143761 A1 | 6/2012 | Doran et al. | |
| 2014/0188657 A1 | 7/2014 | Patterson | |
| 2014/0207518 A1 | 7/2014 | Kannan et al. | |
| 2014/0278821 A1* | 9/2014 | McConnell | H04L 67/306 |
| | | | 705/7.38 |

OTHER PUBLICATIONS

"U.S. Appl. No. 15/394,661, Final Office Action dated Nov. 15, 2019", 10 pgs.

"U.S. Appl. No. 15/394,661, Non Final Office Action dated May 3, 2019", 16 pgs.

"U.S. Appl. No. 15/394,661, Notice of Allowance dated Mar. 26, 2020".

"U.S. Appl. No. 15/394,661, Response filed Feb. 17, 2020 to Final Office Action dated Nov. 15, 2019".

"U.S. Appl. No. 15/394,661, Response filed Aug. 5, 2019 to Non Final Office Action dated May 3, 2019", 12 pgs.

* cited by examiner

ONLINE SOCIAL MEDIA NETWORK ANALYZER

CROSS-REFERENCE TO RELATED APPLICATION

This application is a continuation of U.S. patent application Ser. No. 15/394,661, filed Dec. 29, 2016, which is incorporated by reference herein in its entirety.

BACKGROUND

Increasingly, individuals use online social network platforms (also referred to as Internet-based social networks) to access a variety of information and content, such as articles on various topics, updates related to a user and individuals within the user's network, friend suggestions, advertisements, news stories, and the like. Among other things, embodiments of the present disclosure can be used to help identify users of a social network based on various information.

BRIEF DESCRIPTION OF THE DRAWINGS

In the drawings, which are not necessarily drawn to scale, like numerals can describe similar components in different views. Like numerals having different letter suffixes can represent different instances of similar components. Some embodiments are illustrated by way of example, and not of limitation, in the figures of the accompanying drawings, in which.

DETAILED DESCRIPTION

The description that follows includes systems, methods, techniques, instruction sequences, and computing machine program products that embody illustrative embodiments of the disclosure. In the following description, for the purposes of explanation, numerous specific details are set forth in order to provide an understanding of various embodiments of the inventive subject matter. It will be evident, however, to those skilled in the art, that embodiments of the inventive subject matter may be practiced without these specific details. In general, well-known instruction instances, protocols, structures, and techniques are not necessarily shown in detail.

Figure 1:
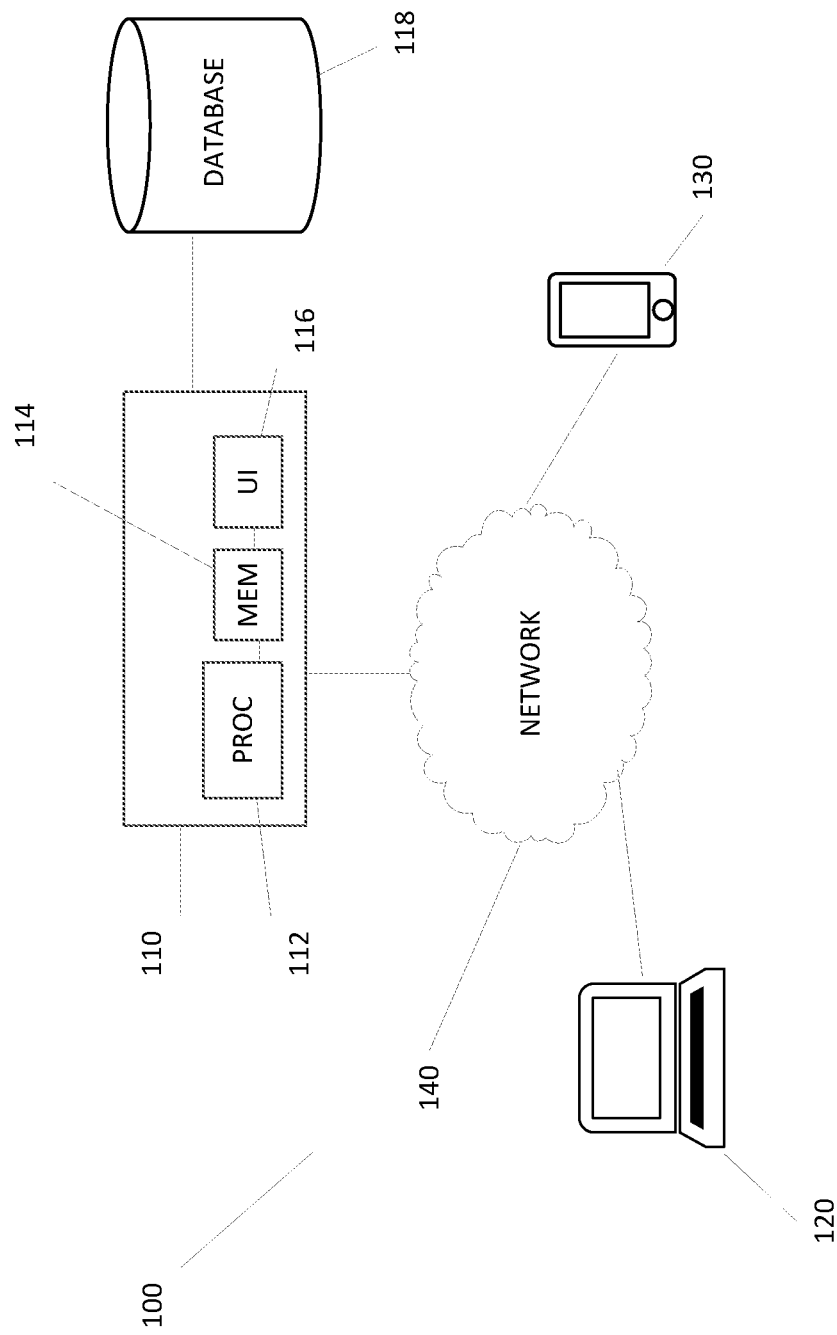
FIG. 1 illustrates a block diagram of an exemplary system according to various aspects of the disclosure.

FIG. 1 is a block diagram of system which may be used in conjunction with various embodiments. While FIG. 1 illustrates various components of a computer system, it is not intended to represent any particular architecture or manner of interconnecting the components. Other systems that have fewer or more components may also be used.

In FIG. 1, the system 100 includes a server computer system 110 comprising a processor 112, memory 114, and user interface 116. Computer system 110 may include any number of different processors, memory components, and user interface components, and may interact with any other desired systems and devices in conjunction with embodiments of the present disclosure.

The functionality of the computer system 110, including the steps of the methods described below (in whole or in part), may be implemented through the processor 112 executing computer-readable instructions stored in the memory 114 of the system 110. The memory 114 may store any computer-readable instructions and data, including software applications, applets, and embedded operating code. Portions of the functionality of the methods described herein may also be performed via software operating on one or more of the client computing devices 120, 122, 130.

The functionality of the system 110 or other system and devices operating in conjunction with embodiments of the present disclosure may also be implemented through various hardware components storing machine-readable instructions, such as application-specific integrated circuits (ASICs), field-programmable gate arrays (FPGAs) and/or complex programmable logic devices (CPLDs). Systems according to aspects of certain embodiments may operate in conjunction with any desired combination of software and/or hardware components. The processor 112 retrieves and executes instructions stored in the memory 114 to control the operation of the system 110. Any type of processor, such as an integrated circuit microprocessor, microcontroller, and/or digital signal processor (DSP), can be used in conjunction with embodiments of the present disclosure. A memory 114 operating in conjunction with embodiments of the disclosure may include any combination of different memory storage devices, such as hard drives, random access memory (RAM), read only memory (ROM), FLASH memory, or any other type of volatile and/or nonvolatile memory. Data can be stored in the memory 114 in any desired manner, such as in a relational database.

The system 110 includes a user interface 116 that may include any number of input devices (not shown) to receive commands, data, and other suitable input. The user interface 116 may also include any number of output devices (not shown) to provides the user with data, notifications, and other information. Typical I/O devices may include mice, keyboards, modems, network interfaces, printers, scanners, video cameras and other devices.

The system 110 may communicate with one or more client computing devices 120, 122, 130 as well as other systems and devices in any desired manner, including via network 140. The system 110 and/or computing devices 120, 122, 130 may be, include, or operate in conjunction with, a laptop computer, a desktop computer, a mobile subscriber communication device, a mobile phone, a personal digital assistant (PDA), a tablet computer, an electronic book or book reader, a digital camera, a video camera, a video game console, and/or any other suitable computing device. In one exemplary embodiment, described in more detail below, client computing device 120 is operated by a first service provider, client computing device 122 is operated by a second service provider, and client computing device 130 is operated by a customer seeking a service provided by one or both the first service provider and the second service provider. Embodiments of the present disclosure may operate in conjunction with any number of different customer and/or provider computing devices.

The network 140 may include any electronic communications system or method. Communication among components operating in conjunction with embodiments of the present disclosure may be performed using any suitable communication method, such as, for example, a telephone network, an extranet, an intranet, the Internet, point of interaction device (point of sale device, personal digital assistant (e.g., iPhone®, Palm Pilot®, Blackberry®), cellular phone, kiosk, etc.), online communications, satellite communications, off-line communications, wireless communications, transponder communications, local area network (LAN), wide area network (WAN), virtual private network (VPN), networked or linked devices, keyboard, mouse and/or any suitable communication or data input modality. Systems and devices of the present disclosure may utilize TCP/IP communications protocols as well as IPX, Appletalk, IP-6, NetBIOS, OSI, any tunneling protocol (e.g. IPsec, SSH), or any number of existing or future protocols.

The system 110 may include (e.g., in the memory 114) a database, and may communicate with any number of other databases, such as database 118. Any such databases may include a relational, hierarchical, graphical, or object-oriented structure and/or any other database configurations. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically.

Figure 2:
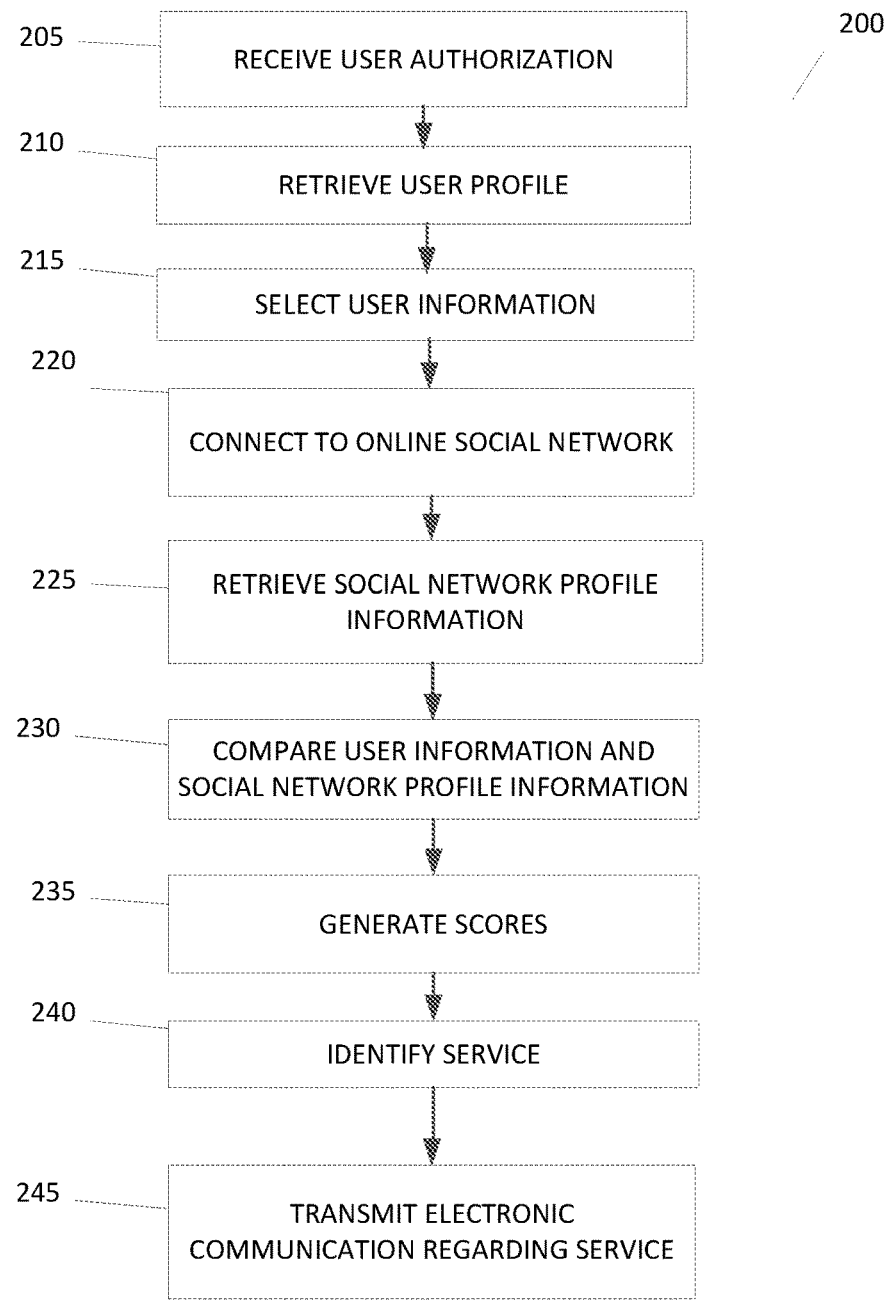
FIG. 2 is a flow diagram of an exemplary process according to various aspects of the disclosure.

FIG. 2 depicts an exemplary process according to various aspects of the present disclosure. In this example, method 200 includes receiving authorization from a user to access the user's profile on a financial services system (205), retrieving the user's profile from the financial services system (210), selecting information from the user's profile (215), connecting to an online social network (220), retrieving information from profiles on the online social network (225) comparing the user's information and the information from the profiles of the online social network (230), generating a score for the social network profiles (235), identifying services sought by the user or members of the social network (240), and transmitting an electronic communication regarding the service (245). The steps of method 200 may be performed in whole or in part, may be performed in conjunction with some or all of the steps in other methods, and may be performed by any number of different systems, such as the systems described in FIGS. 1 and/or 3.

Embodiments of the present disclosure may be used to identify a social network profile associated with a user of a financial services system. For example, in the system 100 shown in FIG. 1, a server computer system 110 communicates (over network 140) with the computing device of a financial services system 120 and a computing device of a user 130. The user and/or financial services system may be or include any number of different individuals, organizations, systems, devices, and the like. While three computing devices are shown in the exemplary system in FIG. 1, embodiments of the present disclosure may also operate in conjunction with any number of different customer and/or service provider computer systems. For example, the steps of method 200 may be performed by the financial services system computing device 120.

In the exemplary method 200 shown in FIG. 2, the system (e.g., server computer system 110 in FIG. 1 or another computer system) receives authorization from the user to retrieve the user's profile from the financial services system 120. The authorization may be received, for example, in an electronic communication transmitted from the user's computing device 130 to the server 110 via network 140 (e.g., the Internet). The system can request authorization from the user to retrieve information regarding the user. The user can also pre-authorize such retrieval or authorize the retrieval on a case-by-case basis.

The system retrieves the user's profile (210) and selects information from the profile (215) to use in searching the profiles of online social networks. A variety of information about the user may be retrieved, such as a residence of the user, an age of the user, a name of the user, a history of searches of web pages hosted by the system, a history of advertisements provided to the user, a list of web page cookies provided to the user, security information associated with the user, a name of an employer of the user, mortgage information for the user, information regarding transactions for a financial account associated with the user on the financial services system, and other information.

The system may retrieve the user's profile and other information regarding the user from a variety of sources, in addition to the financial services system 120. In some embodiments, user information is received from a system or device in communication with the system (e.g., from the memory 114 or database 118 in communication with the server computer system 110 in FIG. 1). In other embodiments, the system may request such information from the user via, for example, an electronic communication from the system 110 to the user's computing device 130 (e.g., in a text message, email, chat, and/or other electronic communications). The user information may also be received by the system 110 via selections and entries made by the user via a web page. Furthermore, the user information may be transmitted to the server using software features of the system 110 accessible to the customer's computing device 120 via an application programming interface (API). In some embodiments, the system may be controlled by a financial institution or other entity with whom the user/customer has a financial services system account.

The system connects to one or more online social networks (220) and retrieves information (225) from a plurality of profiles on the online social network(s). Any desired information may be retrieved from the online social network profiles, including one or more of the following associated with an online social network profile: a name, a city of residence, categorization information for posts (e.g., hashtagged terms), network connections (e.g., family members, friends, etc.), and posting data (e.g., information on images, articles, and other content the user posts or shares on the social network). The system may analyze every available profile on a social network, or select a subset of the total profiles based on various criteria. For example, for a male user that is 35 and living in Chicago (based on the information from the user's financial services system profile), the system may select social network profiles for users that live in Illinois, are over 30 years old, and are male.

The system compares the information associated with the user with the information from the social network profiles (230) and generates scores (235) for each respective social network profile reflecting the likelihood that the respective social network profile is associated with the user. For example, the system may compare five pieces of information gathered from the user's financial services system profile to five pieces of information collected from each social network profile, and add 20% to a total score for each matching piece of information. In a specific example, the five pieces of information could be: name, age, residence, relatives, and employer name. A social network profile where there is only one match (e.g., age) between the user's information and the social network profile's information could be assigned a score of 20%. A social network profile where four of five of the pieces of information match (e.g., name, age, residence, and employer name) could be assigned a score of 80%. In addition to using percentages as the score, other scoring systems (e.g., numeric, alphanumeric, etc.) may also be used in conjunction with embodiments of the present disclosure.

In some embodiments, different criteria could be assigned different weights in determining the score (235). For example, using the five criteria listed above, an identical name and an identical employer name could each be given a weight of 30%, while a matching age could be given a weight of 20% and residence and relatives each given a weight of 10%.

The system may further assign a score based on a complete match or a partial match. For example, if a complete matching name (e.g., "John Smith" in both the user's information and a social network profile) is assigned 30% to the generated score, a partial match (e.g., "John Smith" in the user's information and "Jonathan Smith" in the social network profile) could be assigned 25%, or another portion of the maximum for a complete match.

The system may infer information in a social network profile based on an analysis of the profile. For example, the system may cross reference family names identified from the information from the plurality of profiles on the online social network with a name of the user identified from the profile of the user on the financial services system. In a specific example of this, consider a case where information in the user's profile on the financial services system indicates the user is married with two children, and the names of the user's spouse are included in the user's profile. The system may cross-reference the names of the user's spouse and children with names referenced in the user's social network profile (e.g., tagged in images, mentioned in posts, etc.).

They system may also identify similarities in geographical locations based on the user's profile information on the financial services system and location information determined for an online social network profile. For example, the system may compare global positioning system tracking data from the user's computing device and/or transaction location data from the user's profile on the financial services system, with one or more of the following from the plurality of profiles on the online social network: a past residence, a current residence, and multiple residences. In one particular example, the system may determine that a user's profile indicates the user has a current residence in Miami, Fla., a vacation home in Key West, Fla., and a previous residence in Fort Lauderdale, Fla. (all in the southern part of Florida) may limit its search of social network profiles to those in south Florida.

The system may gather information from social network profiles by performing an analysis of text in a profile, as well as performing analyses on the images or video in a profile. For example, the system may perform an image analysis on images from the plurality of profiles on the online social network to identify one or more locations, and cross-reference the one or more locations identified from the images with a location associated with the profile of the user on the financial services system. Using the previous example, pictures of Miami, Key West, and/or Fort Lauderdale in social network profiles may be identified by the system to link the social media account with those locations.

In conjunction with analyzing the user's financial service system profile and/or the profiles of online social networks, the system may identify a service (240) sought by an individual and transmit an electronic communication (245) offering the service to the individual. For example, the system may identify, from the information from the plurality of profiles on the online social network, a second user of the online social network seeking a service provided by the financial services system, and transmit an electronic communication offering the service provided by the financial services system to the second user via the online social network. Likewise, the system may identify, from the information from the user's profile, a service sought by the user and provided by the financial services system, and transmit an electronic communication offering the service provided by the financial services system to a computing device of the user via the Internet.

Embodiments of the present disclosure may communicate with the user computing device 130 or other systems using any desired electronic communication format, such as short message service (SMS) or multimedia message service (MMS) text messages, emails, instant messages (IM), Internet relay chat (IRC), and other communications.

Figure 3:
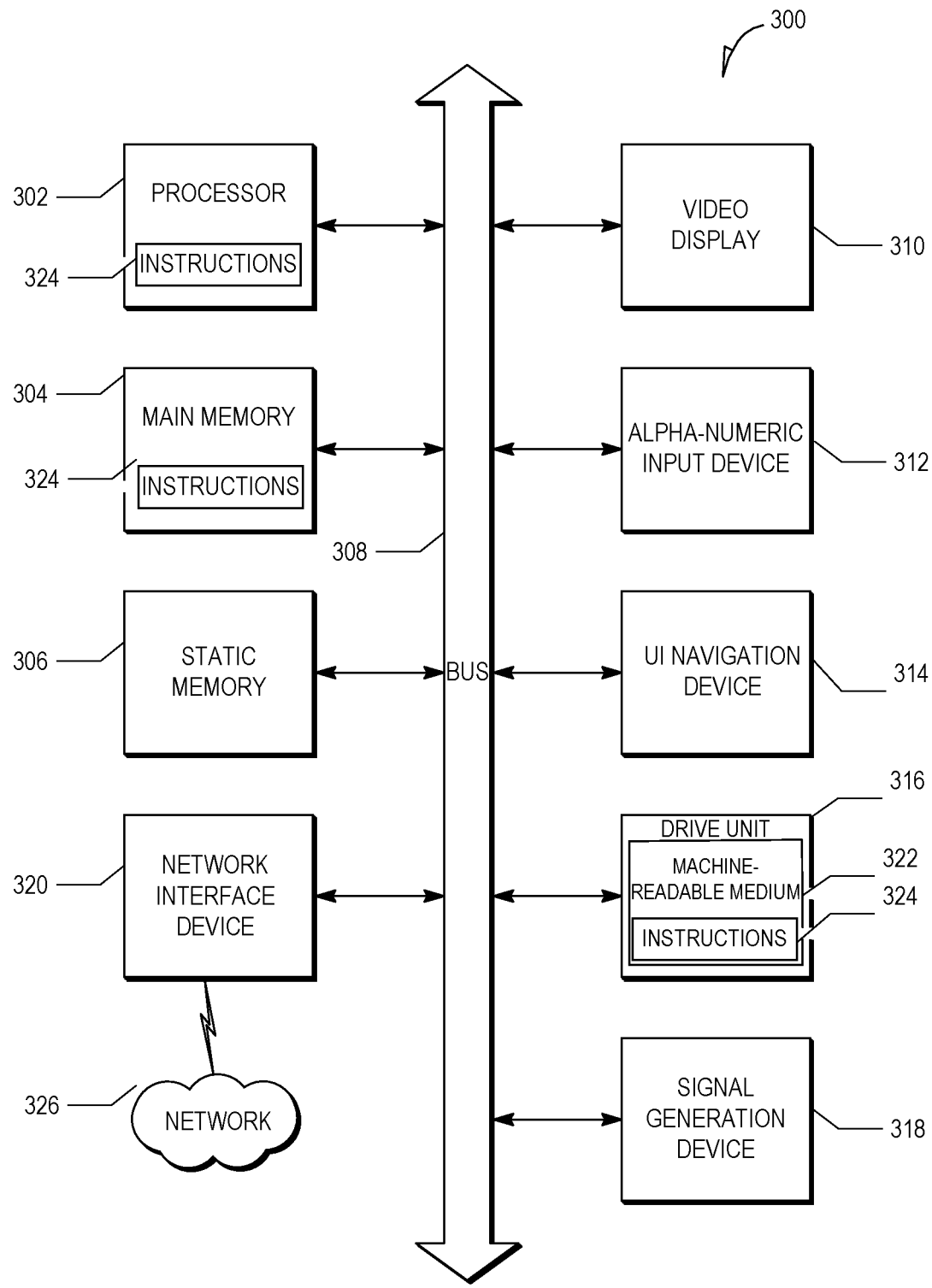
FIG. 3 is a block diagram of an exemplary machine according to various aspects of the disclosure.

FIG. 3 is a block diagram illustrating exemplary components of a computing system 300 that may operate in conjunction with embodiments of the present disclosure. System 300 (in whole or in part) may be (or include) any of the computing devices 110, 120, 122, 130 shown in FIG. 1. In this example, system 300 reads instructions 324 from a machine-readable medium (e.g., a tangible, non-transitory, machine-readable storage medium) 302 to perform a variety of functions, including any of the processes (in whole or in part) described herein.

System 300 can be connected (e.g., networked) to other machines. In a networked deployment, the system 300 can operate in the capacity of a server machine or a client machine in a server-client network environment, as well as a peer machine in a peer-to-peer (or distributed) network environment. System 300 may be (or include) a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 324, sequentially or otherwise, that specify actions to be taken by that machine. While only a single machine is illustrated in FIG. 3, the term "machine" or "system" as used herein may also include any number of different devices, systems, and/or machines that individually or jointly execute the instructions 324 to perform any one or more of the methodologies discussed herein. Additionally, alternate systems operating in conjunction with the embodiments of the present disclosure may have some, all, or multiples of the components depicted in FIG. 3.

In the example shown in FIG. 3, system 300 includes processor 302. Any processor may be used in conjunction with the embodiments of the present disclosure, such as a central processing unit (CPU), a graphics processing unit (GPU), a digital signal processor (DSP), an application specific integrated circuit (ASIC), a radio-frequency integrated circuit (RFIC), or any suitable combination thereof. System 300 further includes a main memory 304 and a static memory 306, which are configured to communicate with each other via a bus 308.

The system 300 further includes a user interface that may include a variety of components, including one or more output devices such as a graphics display 310 (e.g., a plasma display panel (PDP), a light emitting diode (LED) display, a liquid crystal display (LCD), a projector, or a cathode ray tube (CRT)). The user interface of the system 300 may also include any number of input devices and other components, including an alphanumeric input device 312 (e.g., a keyboard), a cursor control device 314 (e.g., a mouse, a touchpad, a trackball, a joystick, a motion sensor, or other pointing instrument), a storage unit 316, a signal generation device 318 (e.g., a speaker), and a network interface device 320.

The storage unit 316 includes a machine-readable medium 322 on which is stored the instructions 324 (e.g., software) embodying any one or more of the methodologies or functions described herein. The instructions 324 can also reside, completely or at least partially, within the main memory 304, within the processor 302 (e.g., within the processor's cache memory), or both, during execution thereof by the system 300. Accordingly, the main memory 304 and the processor 302 can be considered as machine-readable media. The instructions 324 can be transmitted or received over a network 326 via the network interface device 320.

As used herein, the term "memory" may refer to any machine-readable medium able to store data temporarily or permanently, including random-access memory (RAM), read-only memory (ROM), buffer memory, flash memory, and/or cache memory. While the machine-readable medium 322 is shown in this example as a single medium, the term "machine-readable medium" may include a single medium or multiple media (e.g., a centralized or distributed database, or associated caches and servers) able to store instructions 324. The term "machine-readable medium" may also include any medium, or combination of multiple media, that is capable of storing instructions (e.g., software) 324 for execution by a machine. Accordingly, a "machine-readable medium" refers to a single storage apparatus or device, as well as "cloud-based" storage systems or storage networks that include multiple storage apparatus or devices. The term "machine-readable medium" may also include one or more data repositories in the form of a solid-state memory, an optical medium, a magnetic medium, or any suitable combination thereof.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific exemplary embodiments, various modifications and changes may be made to these embodiments without departing from the broader scope of embodiments of the present disclosure. Such embodiments of the inventive subject matter may be referred to herein, individually or collectively, by the term "invention" merely for convenience and without intending to voluntarily limit the scope of this application to any single disclosure or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

In this document, the terms "a" or "an" are used, as is common in patent documents, to include one or more than one, independent of any other instances or usages of "at least one" or "one or more." In this document, the term "or" is used to refer to a nonexclusive or, such that "A or B" includes "A but not B," "B but not A," and "A and B," unless otherwise indicated. In this document, the terms "including" and "in which" are used as the plain-English equivalents of the respective terms "comprising" and "wherein." Also, in the following claims, the terms "including" and "comprising" are open-ended, that is, a system, device, article, composition, formulation, or process that includes elements in addition to those listed after such a term in a claim are still deemed to fall within the scope of that claim. Moreover, in the following claims, the terms "first," "second," and "third," etc. are used merely as labels, and are not intended to impose numerical requirements on their objects.

What is claimed is:

1. A system comprising:
a processor; and
a memory coupled to the processor and storing instructions that, when executed by the processor, cause the system to perform operations comprising:
receiving authorization, from a first user, to access a first user profile of a services system;
based on receiving the authorization, accessing via an application programming interface, from a database at the services system, information stored in the first user profile, the information stored in the first user profile including geographic location data from a computing device of the first user;
connecting to an online social network to retrieve information from a plurality of profiles of the online social network;
comparing respective information associated with the plurality of profiles to information stored in the first user profile, wherein comparing includes:
performing image analysis on an image from each particular profile of the plurality of profiles of an online social network to determine a geographic image location for each particular profile; and
cross-referencing the respective geographic image locations from each particular profile with the geographic location data from the computing device of the first user to identify a first profile associated with the first user on the online social network;
selecting a second profile from the plurality of profiles based on the geographic image location for the first profile being within a same geographic region as the geographic location information of the second profile of a second user; and
transmitting an electronic communication, via the online social network, the electronic communication offering a service provided to the first user, wherein the service is based on an identified service in the second profile of the second user.

2. The system of claim 1, wherein the service is provided by a financial services system.

3. The system of claim 1, wherein the identified service in the second profile is identified from services previously requested by the second user.

4. The system of claim 1, wherein selecting the first profile is further based on identifying the first profile and the second profile having a similar user connection in the online social network.

5. The system of claim 1, wherein selecting the first profile from the plurality of profiles is further based on determining the first user is a spouse of the second user.

6. The system of claim 1, wherein determining the respective geographic location for each particular profile further includes financial transaction location data from each particular profile.

7. The system of claim 1, wherein selecting the first profile from the plurality of profiles is further based on a family name of the first profile matching a family name of the second profile.

8. A method comprising:
receiving authorization, from a first user, to access a first user profile of a services system;
based on receiving the authorization, accessing via an application programming interface, from a database at the services system, information stored in the first user profile, the information stored in the first user profile including geographic location data from a computing device of the first user;
connecting to an online social network to retrieve information from a plurality of profiles of the online social network;
comparing respective information associated with the plurality of profiles to information stored in the first user profile, wherein comparing includes:
performing image analysis on an image from each particular profile of the plurality of profiles of an online social network to determine a geographic image location for each particular profile; and
cross-referencing the respective geographic image locations from each particular profile with the geographic location data from the computing device of the first user to identify a first profile associated with the first user on the online social network;
selecting a second profile from the plurality of profiles based on the geographic image location for the first profile being within a same geographic region as the geographic location information of the second profile of a second user; and
transmitting an electronic communication, via the online social network, the electronic communication offering a service provided to the first user, wherein the service is based on an identified service in the second profile of the second user.

9. The method of claim 8, wherein the service is provided by a financial services system.

10. The method of claim 8, wherein the identified service in the second profile is identified from services previously requested by the second user.

11. The method of claim 8, wherein selecting the first profile is further based on identifying the first profile and the second profile having a similar user connection in the online social network.

12. The method of claim 8, wherein selecting the first profile from the plurality of profiles is further based on determining the first user is a spouse of the second user.

13. The method of claim 8, wherein determining the respective geographic location for each particular profile further includes financial transaction location data from each particular profile.

14. The method of claim 8, wherein selecting the first profile from the plurality of profiles is further based on a family name of the first profile matching a family name of the second profile.

15. A non-transitory machine readable medium storing instructions that, when executed by a computer system, cause the computer system to perform operations comprising:
receiving authorization, from a first user, to access a first user profile of a services system;
based on receiving the authorization, accessing via an application programming interface, from a database at the services system, information stored in the first user profile, the information stored in the first user profile including geographic location data from a computing device of the first user;
connecting to an online social network to retrieve information from a plurality of profiles of the online social network;
comparing respective information associated with the plurality of profiles to information stored in the first user profile, wherein comparing includes:
performing image analysis on an image from each particular profile of the plurality of profiles of an online social network to determine a geographic image location for each particular profile; and
cross-referencing the respective geographic image locations from each particular profile with the geographic location data from the computing device of the first user to identify a first profile associated with the first user on the online social network;
selecting a second profile from the plurality of profiles based on the geographic image location for the first profile being within a same geographic region as the geographic location information of the second profile of a second user; and
transmitting an electronic communication, via the online social network, the electronic communication offering a service provided to the first user, wherein the service is based on an identified service in the second profile of the second user.

16. The non-transitory machine readable medium of claim 15, wherein the service is provided by a financial services system.

17. The non-transitory machine readable medium of claim 15, wherein the identified service in the second profile is identified from services previously requested by the second user.

18. The non-transitory machine readable medium of claim 15, wherein selecting the first profile is further based on identifying the first profile and the second profile having a similar user connection in the online social network.

19. The non-transitory machine readable medium of claim 15, wherein selecting the first profile from the plurality of profiles is further based on determining the first user is a spouse of the second user.

20. The non-transitory machine readable medium of claim 15, wherein determining the respective geographic location for each particular profile further includes financial transaction location data from each particular profile.

* * * * *